March 8, 1966  J. HUMPHRIES ETAL  3,239,825
TARGET SIMULATING APPARATUS FOR USE IN A RADAR SYSTEM
Filed May 8, 1964  6 Sheets-Sheet 2

Inventors
John Humphries
Eric F. V. Robinson
By Cushman, Darby & Cushman
Attorneys United States Patent Office 3,239,825
Patented Mar. 8, 1966

3,239,825
TARGET SIMULATING APPARATUS FOR USE
IN A RADAR SYSTEM
John Humphries and Eric F. V. Robinson, Ottawa, Ontario, Canada, assignors to National Research Council, Ottawa, Ontario, Canada, a body corporate of Canada
Filed May 8, 1964, Ser. No. 365,942
Claims priority, application Canada, May 24, 1963, 876,336
4 Claims. (Cl. 343—17.7)

This invention relates to improvements in a radar system for use in locating enemy weapons by obtaining echoes from the projectiles fired by such weapons.

The invention is concerned with a radar system which operates by determining at least two points through which a projectile passes, the system including a computer for determining from two of such determined points the point of intersection of the trajectory of the projectile with a working plane. The system is of particular utility when the weapon itself is hidden from direct visual or radar observation.

The system is equally useful for watching friendly projectiles aimed at the enemy weapon. In this case it determines the points of impact or burst of the friendly projectiles by making the same extrapolation for the trajectory of a falling projectile as for a rising projectile. The point to be located through which the trajectory extends (whether for a rising or falling projectile) is called the target point. In the general case, the target point is the point of intersection of the projectile trajectory with a selected plane referred to as the "working plane," the working plane being defined as the plane including the line between the radar system and the target point and all horizontal lines perpendicular to said line. The angle of the working plane will generally be chosen to give a ground location for the target point, but this is not necessarily so, especially when observing a friendly projectile which has been fused for air burst.

Such a system is described in W. C. Brown et al. United States Patent No. 3,182,319, issued May 4, 1965. This application describes a system the antenna of which provides a narrow beam substantially circular in cross-section having a width of approximately 16 mils (approximately 1°, a mil being 360°/6400) in both directions. The system causes this narrow beam to scan horizontally through approximately 400 mils (22.5°) alternately in two planes separated in angle by approximately 40 mils (2.25°) at beam centres. This action defines, by narrow beam locus, two vertically superposed, generally horizontal, fan-shaped beams, each scanned 20 times per second, hereinafter referred to as the upper and lower beams.

Echoes (intercepts) received from each of the upper and lower beams when a projectile passes through it, are displayed on a range-azimuth radar display in two series (one for each of said beams). The duty of the operator is to observe or mark the centre points of the leading edges of the first and last echoes received in each of the upper and lower beams and to estimate and mark the mean points between each pair of these two extreme centre points. The radar screen is provided with an outer surface than can readily be marked by the operator using a suitable stylus. Having marked the mean centre points on the screen, the operator then feeds information concerning the positions of these points into a computer which calculates an extrapolated target point on the working plane through which the projectile trajectory passes. The computer displays the position of this target point in counters as representing the position of the weapon or point of impact or burst of a friendly projectile. During the course of this operation, the operator normally also determines ΔT, the time between the projectile being in similar positions in the upper and lower beams.

As above mentioned, the system may be used for observing rising projectiles (normally enemy) or falling projectiles (normally friendly). In a modification to the basic system described in C. R. Clemence et al. United States Patent No. 3,182,317, issued May 4, 1965, a method is disclosed of observing both rising and falling projectiles during the same period of operation, means being provided to indicate in the radar system the differences between the coordinates of the various target points computed. These differences are then conveyed to the friendly gunners to enable them to correct their fire to direct it more accurately onto the enemy weapon. When using the radar system in this way, it is necessary for the operator to be able to distinguish those echoes on his screen from falling projectiles from those received from rising ones. Since falling projectiles will pass first through the upper beam and then through the lower beam, while rising projectiles will pass through the beams in the reverse order, the necessary identification can always be made, provided the operator is able to recognize those echoes which are returned in each of the respective beams.

Means for positively identifying the echoes returned in a selected one of the beams is described in A. Hendry et al., United States Patent No. 3,182,309, issued May 4, 1965. This application discloses means responsive to the scope sweep signals corresponding to the scanning in a selected one of the beams only, these means producing delayed identification signals in predetermined time relation to the echo signals in such selected beam. The identification signals are displayed adjacent the true echo signals, thus positively identifying the selected beam.

The present invention is concerned with further improvements in this general type of radar system, although it is not necessarily limited to all the specific features thereof. The present invention is concerned more specifically with the provision of a target simulating circuit for use in the training of operators. It may not always be convenient to have available a weapon suitably placed for firing projectiles, and, in any event, the actual firing of weapons is a comparatively expensive method of initial operator training. Obviously operator training would be facilitated by mechanism for artificially feeding into the radar system signals simulating the actual echoes received in practice from typical moving projectiles. Additionally, the instructor can more readily select and vary the problems presented to the operator.

The invention thus consists of target simulating apparatus for use with a radar system having essentially means for producing a plurality of radar beams, means synchronised with said producing means for generating azimuth sweep signals corresponding to each of said beams, means for generating range sweep signals, and a range-azimuth display connected to said generating means to receive the azimuth and range sweep signals. Such target simulating apparatus comprises
(a) Means for generating a first series of range pulses synchronised with the range sweep signals, including means for progressively modifying the timing of each successive such range pulse in relation to successive range sweep signals,
(b) Means for duplicating each of said range pulses a predetermined short time after its occurrence to generate a second series of range pulses,
(c) Means for generating a first series of azimuth pulses synchronised with the azimuth sweep signals, including means for progressively modifying the timing of each successive such azimuth pulse in relation to successive azimuth sweep signals,
(d) Means for duplicating each of said azimuth pulses a predetermined short time after its occurrence to generate a second series of azimuth pulses, (e) Selection and gating means for emitting a first sequence of output pulses each appearing upon coincident input of
  (i) A pulse of a selected one of said range pulse series,
  (ii) A pulse of a selected one of said azimuth pulse series,
  (iii) And a first-occurring actuating pulse,
and for emitting a second sequence of output pulses each appearing upon coincident input of
  (iv) A pulse of a selected one of said range pulse series,
  (v) A pulse of a selected one of said azimuth pulse series,
  (vi) And a second-occurring actuating pulse, (f) And means transmitting said sequences of output pulses to said display to simulate echo signals returned in said beams.

One manner of carrying the present invention into practice is illustrated diagrammatically in the accompanying drawings. The specific system illustrated is provided by way of example, the broad scope of the invention being limited only by the appended claims. In these drawings:

*Overall system (FIGURE 1)*

Figure 1:
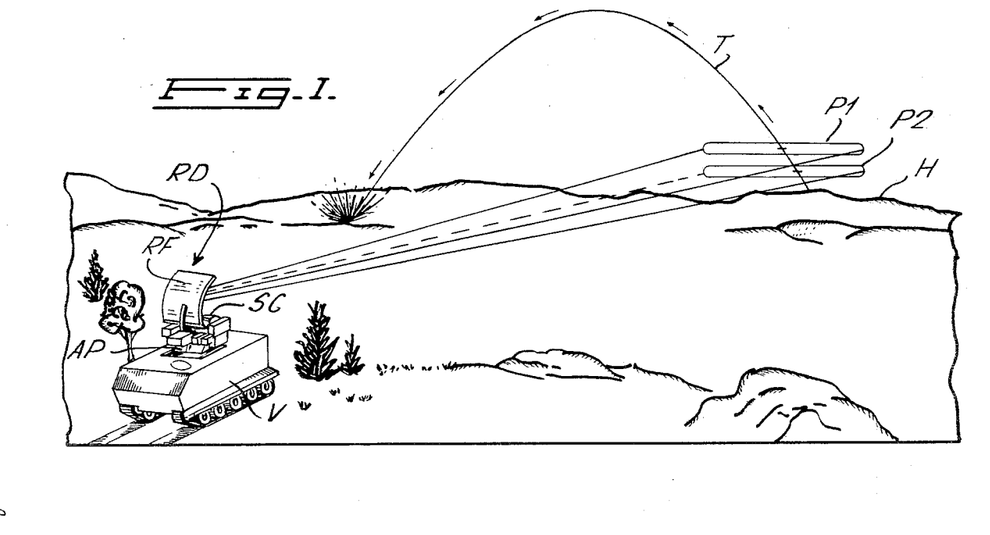
FIGURE 1 is a general perspective view of a radar system in operation.

FIGURE 1 shows the radar system RD mounted on a vehicle V being used to observe the trajectory T of a projectile fired by a mortar positioned out of direct visual or radar range behind hills H. The antenna system of the radar system RD provides a narrow beam substantially circular in cross-section having a width of approximately 16 mils (approximately 1°) in both directions. The system causes this narrow beam to scan horizontally through approximately 400 mils (22.5°) alternately in two planes P1 and P2 separated in angle by approximately 40 mils (2.25°) at beam centres. This action defines, by the narrow beam locus, two vertically superposed generally horizontal fan-shaped beams, each scanned approximately 20 times per second, hereinafter referred to as the upper and lower beams. This effect is achieved by use of a Foster type scanner SC similar to that disclosed in Foster U.S. Patent No. 2,832,936, issued April 29, 1958, and modified to provide a dual beam in a manner similar to that described in "Mobile Radar Pinpoints Enemy Mortar Positions," by M. S. Jaffee et al., "Electronics," September 18, 1959, page 34 et seq. The scanner SC is placed at the focus of a semi-parabolic cylinder RF which reflects two focused beams. The scanner SC and reflector RF are mounted as an assembly on an antenna platform AP on the vehicle V, which platform is maintained horizontal at all times (see United States patent application C. R. Clemence et al. No. 269,363, filed April 1, 1963). The scanner-reflector assembly can be inclined relative to this horizontal platform AP to alter the angle of the beams as a pair while maintaining constant their angular separation.

The limits of this adjustment may for practical purposes be set at 212 mils (12°) above the horizontal to 106 mils (6°) below the horizontal, these angles being between the horizontal and the centre of the lower beam plane P2. The antenna assembly can be rotated to provide complete coverage through 6400 mils (360°) in azimuth.

*Echo display (FIGURE 2)*

As a projectile enters the field of scan of the lower beam, an echo E1 is displayed on the screen S by a group of individual signal returns resulting from a single passage of the narrow beam across the projectile. The centre of the leading (lower) edge of this echo represents the true position of the object (projectile) being observed. As the beam continues to sweep, a series of such echoes appears on the screen S. This series of individual echoes makes up the composite echo E of FIGURE 2. In reality there may be many more than the five individual echoes shown. Some fading of the earlier echoes will have taken place by the time the last echo appears, but they are all shown simultaneously and enlarged from their true size in FIGURE 2 for ease of illustration. The duty of the operator is to observe or mark the centre points of the leading edges of the first and last echoes and to estimate the mean point between these two extreme centre points. The screen S is provided with an outer surface that can readily be marked by the operator using a suitable stylus.

Figure 2:
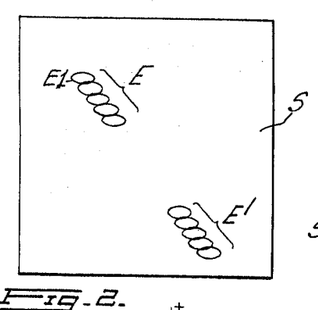
FIGURE 2 is an illustration of typical series of echoes displayed on the radar screen.

Assuming that an enemy weapon is firing from left to right and towards the radar system RD, a further series of echoes is detected a few moments later by the upper beam, being shown as composite echo E′ in FIGURE 2. The echoes of this second series will similarly have leading edge centre points, the mean point of which is determined and marked on the screen by the operator. The upper beam echoes will appear in a lower position on the screen S than the lower beam echoes when the weapon is firing towards the radar system, since the range will have shortened somewhat by the time the projectile reaches the upper beam. If the weapon is firing away from the radar system, the upper beam echoes will appear above the lower beam. Since the upper beam echoes appear first for a falling projectile and second for a rising projectile, the operator is unable to be sure from this display which series (and hence which marked centre point) corresponds to which beam. It is necessary, however, for him to have this knowledge in order for him properly to feed into the computer the information he has obtained.

For feeding the computer, the screen S is provided with a marker spot, which is an electronic marker produced by conventional circuitry in the radar transmitter-receiver combination and synchronised with the scope sweep so as to occupy a single desired position on the screen S determined horizontally by an azimuth marker handwheel and vertically by a range marker handwheel. The operator first moves the marker spot to coincide with the mean point of the lower beam and when he has achieved this coincidence he presses a foot switch to actuate the computer. After closing this switch the operator moves the marker spot to the mean point of the upper beam. In this way the operator feeds into the computer the difference in range and the difference in azimuth between these two mean points. It is essential, however, that the operator move the marker spot from the lower beam point to the upper beam point, and not vice versa: hence the need to know which is the lower beam echo series.

*Echo identification circuit (FIGURES 3 and 4)*

Figures 3, 4:
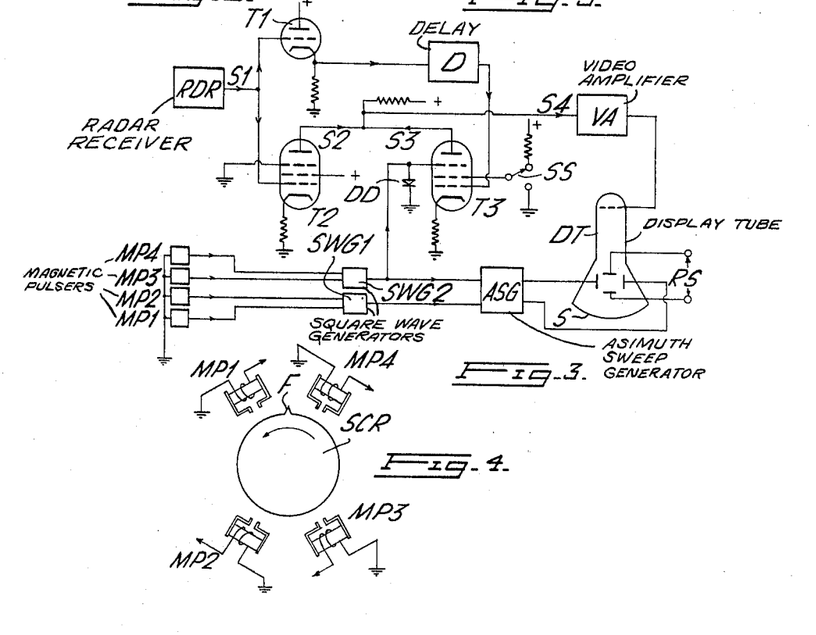
FIGURE 3 is a part of the receiving circuit of the radar system.
FIGURE 4 is a diagrammatic illustration of a fragment of the antenna assembly of the radar system.

FIGURE 3 illustrates a part only of the overall radar receiving circuits. The remainder of these circuits, which is conventional in form, is shown as a block RDR emitting a signal S1.

FIGURE 4 shows the antenna scanner rotor SCR which is fitted with a peripherally projecting finger F which, during each rotation of the scanner (1/20 of a second), sequentially actuates magnetic pulsers MP1, MP2, MP3 and MP4, which gate a pair of square wave generators SWG1 and SWG2 in the following sequence, to start the lower beam (pulser MP1); to stop the lower beam (pulser MP2); to start the upper beam (pulser MP3) and finally to stop the upper beam (pulser MP4). These events serve to synchronise the azimuth sweep signals supplied to the display tube DT with the antenna scanner and hence with emission of the respective beams.

Square wave generator SWG1 controlled by pulsers MP1 and MP2 sends a lower beam gating signal LBG to an azimuth sweep generator ASG which emits a conventional saw-tooth, lower-beam, azimuth sweep signal LBS. Similarly, the square wave generator SWG2 controlled by pulsers MP3 and MP4 sends an upper-beam, gating signal UBG to the sweep generator ASG to cause it to emit a saw-tooth, upper-beam, azimuth sweep signal UBS. Azimuth sweep signal AS, which is the combination of signals LBS and UBS, is applied to the display tube DT.

A range sweep RS is generated by conventional circuits and is applied to form approximately 8000 cycle per second lines.

Each echo signal S1 is applied to the control grid of a pentode T2 to emerge as an amplified signal S2. Signal S1 also passes through cathode follower tube T1 and a conventional delay device D to the control grid of a second pentode T3 to emerge as an amplified and delayed signal S3, when tube T3 is conducting. Signals S2 and S3, combined as signal S4, are amplified in video amplifier VA and applied to the grid of the display tube DT.

Signal S3 appears except when pentode T3 is cut-off by the biassing of its suppressor grid by the negative portion of the square wave produced by generator SWG2. During the period when pentode T3 is conducting diode DD maintains the suppressor of pentode T3 at ground potential.

Figure 5:
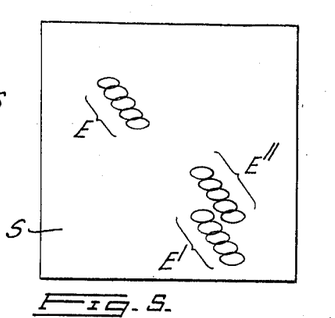
FIGURE 5 is a view similar to FIGURE 2, showing how the display may include identification signals.

As a result, signal S3 appears on the screen S as a second or delayed echo for each of signals S2 returned in the upper beam, but not for those in the lower beam. The result is delayed echo series E" for the upper beam only, thus providing positive identification of this beam. If preferred, the lower beam echo series can be identified by a delayed identification series, this being achieved by connecting the pentode T3 to the output of square wave generator SWG1 instead of to the output of square wave generator SWG2. This identification feature is further described and is claimed in the above-mentioned United States Patent No. 3,182,309.

To turn off the identification means, a switch SS is moved to the lower position shown in FIGURE 3, thus grounding the screen grid of the switching pentode T3 and rendering it non-conducting regardless of the potential existing on its suppressor grid.

*Target simulator and time sequence (FIGURES 6 to 11)*

The range sweep RS (also shown in FIGURE 3) is received from a sweep generator of conventional form providing a saw-tooth range sweep. The frequency is approximately 8000 per second, so that the interval between sweeps is approximately 125 $\mu$sec., although the duration of each saw-tooth pulse is only approximately 13 $\mu$sec. The range sweep RS is also applied to a voltage comparator VC1 (FIGURE 6) which is a conventional circuit of the Schmitt trigger type. There are two other inputs to the voltage comparator VC1. The first of these is a fixed D.C. voltage received from a range position potential divider RPP. The other input received by the voltage comparator VC1 is a saw-tooth signal ASR received from an aspect selector switch ASS. The manner of generation of this range advance signal ASR will be described below. At this stage, it is sufficient to state that this signal will have a comparatively low frequency, its slope being very gradual in relation to the slope of the saw-tooth pulse which the voltage comparator VC1 receives from the range sweep signal RS. These voltages are illustrated diagrammatically in FIGURE 8. The voltage comparator VC1 compares the voltage input from range sweep RS with the combined value of steady voltage from potential divider RPP and the slowly rising (or falling) saw-tooth voltage ASR. When the voltage ASR equals the other two combined (time TM1) the voltage comparator VC1 fires to generate the output pulse shown at VC1 in FIGURE 8, which persists while the sweep RS persists.

Figure 8:
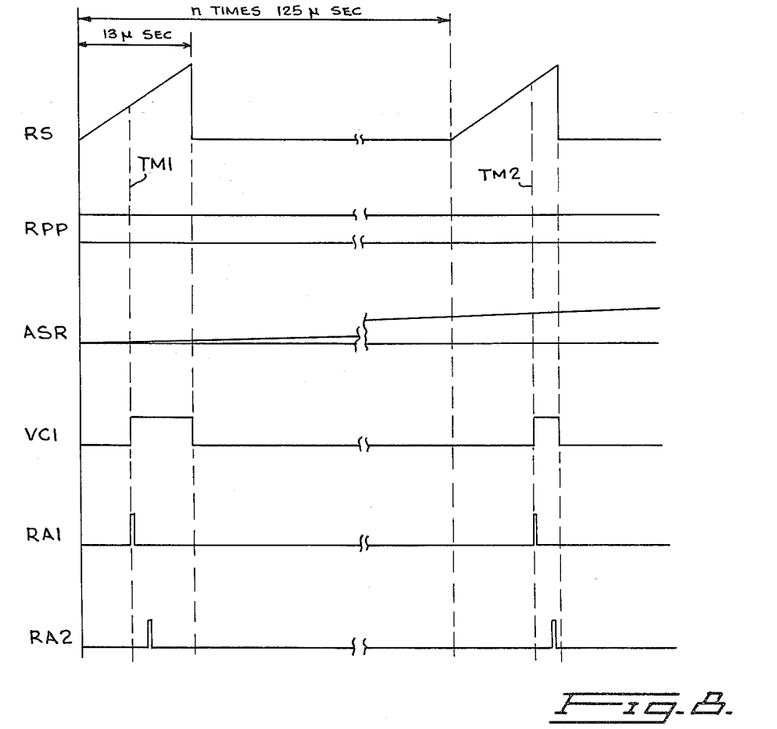
FIGURES 8 and 9 are time sequence diagrams.

It will be observed from FIGURE 8 that, on each subsequent firing of the voltage comparator VC1, the value of ASR will be a little higher, so that the time of firing becomes progressively later in relation to the beginning of each pulse of the range sweep RS (compare times TM1 and TM2). The output of voltage comparator VC1 is fed to a blocking oscillator BO which forms a first series of range pulses RA1 corresponding in time to the leading edges of the output pulses from the voltage comparator VC1 (that is a times TM1 and TM2). Manual adjustment of the range position potential divider RPP serves to change the steady D.C. voltage supplied to the voltage comparator VC1 and thus enables an instructor to move all the pulses RA1 the same amount relative to the beginning of each range sweep pulse.

The pulses RA1 are fed directly to a first terminal of the aspect selector switch ASS as a first range signal. The same pulses are fed through a conventional delay DL1 and are then applied to the aspect selector switch ASS as second series of range pulses RA2 (FIGURE 8). The amount of this delay can be controlled by adjusting the delay DL1 in the usual way.

Figure 6:
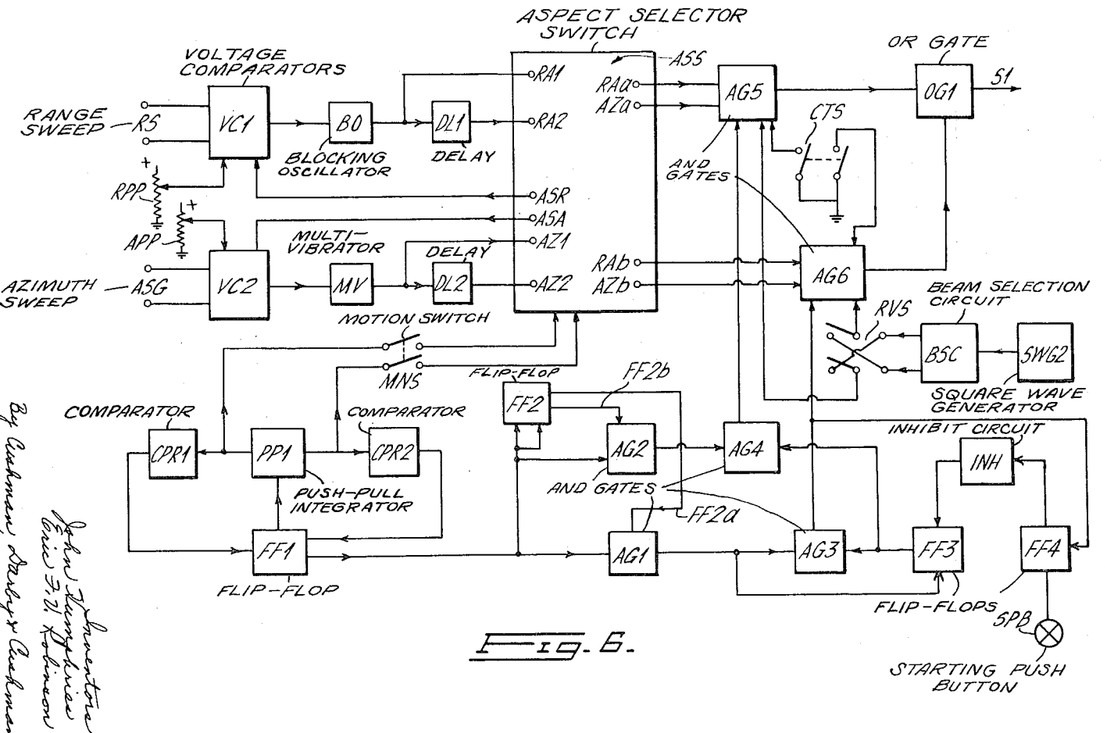
FIGURE 6 shows the circuit of the target simulator.

A basically similar circuit is also provided for azimuth. The output of the azimuth sweep generator ASG (FIGURE 3) is applied to a second voltage comparator VC2 (FIGURE 6). This voltage comparator VC2 acts similarly to the range voltage comparator VC1 to compare the saw-tooth sweep voltage received from the azimuth sweep generator ASG with the sum of a steady D.C. voltage received from an azimuth position potentiometer APP and a saw-tooth azimuth advance signal ASA received from the aspect selector switch ASS.

The frequency of the saw-tooth wave received from the azimuth sweep generator ASG is 40 cycles per second, in comparison with the approximately 8000 cycles of the range sweep received by voltage comparator VC1. The frequency of the signal ASA is the same low frequency (about one cycle per second) as that of signal ASR, these signals being derived from the same circuit, as will subsequently be described. The square wave output from voltage comparator VC2, like that from voltage comparator VC1, commences when each saw-tooth pulse received from the azimuth sweep generator ASG equals in magnitude the combined voltages received from potentiometer APP and signal ASA. This output is fed to a multivibrator MV which serves the same purpose at this frequency as did the blocking oscillator BO at the higher frequency, namely to generate a first series of azimuth pulses AZ1 occurring in times relation to each azimuth sweep but progressively becoming later (or earlier) in relation thereto as the saw-tooth signal ASA increases (or decreases). A second delay line DL2 generates a second series of azimuth pulses AZ2 each delayed a corresponding amount in relation to the pulses of the first series AZ1 by the amount determined by the setting of delay DL2.

The circuit for generating the range and azimuth advance signals ASR and ASA will now be described. This circuit comprises a first flip-flop FF1 feeding a push-pull integrator PPI. The push-pull integrator PPI has a pair of outputs, mutually opposite in phase, and these are fed respectively to a pair of comparators CPR1 and CPR2, the outputs of which are, in turn, fed back to the flip-flop FF1. Each of the comparators is set to fire and emit an output signal once an input signal has reached a predetermined voltage. Assume the flip-flop FF1 is initially in the state to emit a positive D.C. output as indicated at 100 in FIGURE 9. As a result, the push-pull integrator PPI begins to generate the upwardly sloping wave form 101 which it feeds positively to the comparator CPR1. As soon as a certain level 102 set in the comparator CPR1 is reached, this comparator fires and its output energizes the flip-flop FF1 to reverse its state. It immediately reverses the polarity of its output as shown at 103, and consequently the output from the push-pull integrator PPI begins to decline as shown in 104. With the output of the push-pull integrator PPI being fed simultaneously in reverse phase to the second comparator CPR2, the wave face 104 eventually reaches level 102′ set in comparator CPR2 which accordingly fires to actuate the flip-flop FF1 again and return it once more to its first state. The constant reversal of the flip-flop FF1 from one to the other of its states continues at a frequency of about one reversal per second to generate the square wave output shown at FF1 in FIGURE 9. The two triangular shaped outputs from the push-pull integrator PPI shown in FIGURE 9 as inputs to the comparators, are supplied through a motion switch MNS to the aspect selector switch ASS for the purpose now to be described in relation to FIGURE 7. The slope of these triangular waves is controlled by the characteristics of the push-pull integrator PPI and may be varied as desired in a conventional manner, for example, by means for selecting various different time constants within the integrator.

*Aspect selection (FIGURES 7 and 10)*

Figure 7:
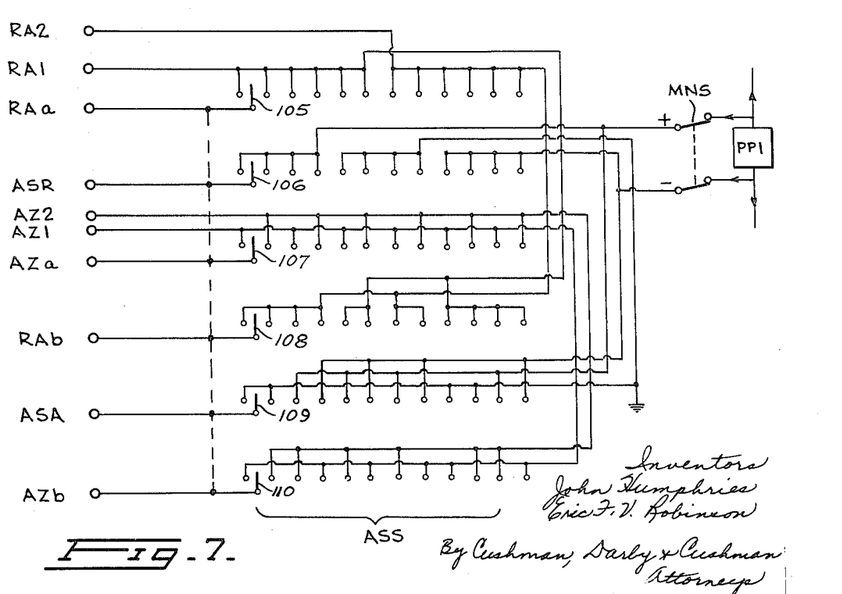
FIGURE 7 is a diagrammatic view of an aspect selector switch forming part of the circuit of FIGURE 6.

The aspect selector switch ASS is shown diagrammatically in FIGURE 7. It has 6 ganged movable contacts 105 and 110 each movable to any one of 12 positions to engage a corresponding fixed contact. It will also be noted from FIGURE 6 that the aspect selector switch ASS has, in addition to those terminals already noted, four other terminals on which appear a pair of range pulse series and a pair of azimuth pulse series. The range series are designated RAa and RAb; and the azimuth series AZa and AZb. As distinct from the first pulse series to be generated RA1 and the second pulse series to be generated RA2, the two range series RAa and RAb represent respectively the first and second range series to be presented on the radar scope. For example, the first range series to be presented RAa may be selected to be the first range series generated RA1 or it may be selected to be the second range series generated RA2. In the same way, the second range series to be presented RAb may be chosen from either of the range series RA1 and RA2. Correspondingly, the first and second azimuth series to be presented AZa and AZb may each be chosen from either of the first and second azimuth series to be generated AZ1 and AZ2.

Figure 10:
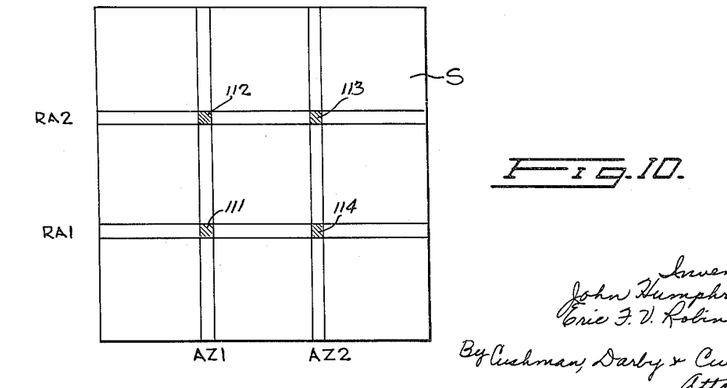
FIGURE 10 is a diagram representing the radar screen.

It is believed that these considerations will be clarified by reference to FIGURE 10 which shows the radar screen S and, diagrammatically, the four simulated echoes 111 to 114 that can be produced thereon by the four areas of intersection of range and azimuth pulses RA1, RA2, AZ1 and AZ2. Pulse RA1 will always appear lower on the screen than pulse RA2 and pulse AZ1 will be always appear to the left of pulse AZ2, because of the delay imparted to pulse series RA2 and AZ2 in their generation, the range sweep direction being upwards and the azimuth sweep being from left to right. It will be appreciated that it may not be desired to present first to the operator the simulated echoes produced by the combination of the first generated range and azimuth series RA1 and AZ1. Indeed, when watching a rising projectile coming towards the radar system, the range when first observed (by the lower beam) will be greater than when later observed (by the upper beam). To simulate this condition it is necessary to present first to the operator one of the intersections with the second range series RA2. To be able to make such a selection is one of the reasons for providing the aspect selector switch ASS. It also functions to enable the range and azimuth intersections to be mixed, so that any two of the four intersection points 111 to 114 can be chosen and either one of the chosen two presented first to the operator.

Returning to a consideration of FIGURE 7 it will be observed that, of the first bank of fixed contacts, the first six are connected to receive the first generated range series RA1, and the second six to receive the delayed range series RA2. The movable contact 105 of this bank provides the output RAa.

Input range series RA1 and RA2 are also connected to the fixed contacts of the fourth bank of contacts, but in a different arrangement. The movable contact 108 of this bank provides the output RAb.

In a like manner, the first and second generated azimuth series AZ1 and AZ2 are connected alternately to the fixed contacts of the third bank of contacts and in a modified alternate arrangement to the fixed contacts of the sixth bank. The movable contacts 107 and 110 of the third and sixth banks respectively provide the outputs AZa and AZb.

The second and fifth banks of contacts serve to transmit in a selected sense the range and azimuth advance signals ASR and ASA from the respective outputs of the push-pull integrator PPI and from a ground connection (to render these signals zero). In this way the movable contacts 106 and 109 of these banks select the sign of the slope of the waves ASR and ASA and hence the direction of modification (advancement or retardation) of successive pulses of the series RA1, RA2, AZ1 and AZ2.

Let it be assumed that the aspect selector switch ASS is in its first position, that is to say with its movable contacts touching the fixed contacts shown to the extreme left of the contact banks in FIGURE 7. The first range series to be presented RAa is thus made to be series RA1 and the first azimuth series to be presented AZa is made to be azimuth series AZ1. Thus the simulated echo which first appears on the screen is in position 111 in FIGURE 10. Signal ASR is connected by contact 106 to the side of the push-pull integrator PPI generating a positive slope. That is to say the signal ASR is increasing as shown in FIGURE 8 and successive pulses RA1 appear further up the screen, that is, simulating a target with increasing range. The effect is to make the overall simulated echo group appear to move up the screen. This is similar to the series of echoes E shown in FIGURE 2, except that these echoes were assumed to be moving downwardly and to the right on the screen to indicate an enemy weapon firing from left to right and towards the radar system. The simulated echoes in the first position of the aspect selector switch ASS will appear to move upwardly (a rising projectile receding from the radar system) and without any change of azimuth. The reason there is no change of azimuth is that azimuth advance signal ASA in the first position of selector switch ASS is connected by contact 109 to ground.

The directly upwardly moving echo group starting from intersection 111 simulates a rising projectile detected in the lower beam. When the upper beam signal appears it must begin at the intersection 112 of range series RA2 and azimuth series AZ1. This is achieved by the second to be presented range series RAb being made the series RA2 by contact 108, and the second to be presented azimuth series AZb being made the first azimuth series AZ1 by contact 110. The manner in which the order of presentation and the duration of presentation is determined has yet to be described in connection with the portion of the circuit on the right hand side of FIGURE 6. Assuming for the present that this required order of presentation is achieved, it will be observed that the first simulated echo beginning at point 111 is caused to move upwardly on the screen. The second simulated echo beginning at point 112 continues this movement.

To take another example from the various switch positions, assume the switch to be in its third position, that is to say with its movable contacts touching the fixed contacts third from the left in each bank. In this position the first presented series RAa and AZa are formed at the intersection 111 of series RA1 and AZ1 as before, but this time, as well as the range advance signal ASR having a positive slope, the azimuth advance signal ASA also has a positive slope. The result is that successive markings on the screen appear to move up and to the right. When the second to be presented echo group appears, this must begin at the intersection 113 of series RA2 and AZ2, which it does, since the second to be presented range and azimuth series RAb and AZb are series RA2 and AZ2 respectively. The echoes appear to move upwardly and to the right, the second echo group appearing in line with a continuation of the first echo group.

It is not proposed to analyze in this detail every position of the aspect selector switch ASS. In brief: position 2 produces a straight up movement of the display from point 114, with the second group starting at point 113; position 4 of the switch moves up and to the left (from 114 to 112); position 5 moves straight across to the right (111 to 114); position 6 moves straight across to the left (114 to 111); position 7 is from 112 to 113; position 8 is from 113 to 112; position 9 is from 112 to 111; position 10 is from 113 to 114; position 11 is from 112 to 114 (the condition shown in FIGURE 2); and position 12 is from 113 to 111. The aspect selector switch ASS thus enables selection of every combination of moving up or down, or to the right or left either straight or at an inclination. The positions of the aspect selector switch ASS have been shown as orderly. However, it may be convenient to arrange the various switch positions in a random manner in relation to the changes produced on the screen. In this way movement of the switch between adjacent positions can achieve a major change in conditions. The other controls may be arranged in a like manner. For example the range and azimuth position potential dividers RPP and APP, which have been shown as continuously variable in FIGURE 6, may be stepped and the steps arranged at random. These potential dividers control the positions of the dual target configuration relative to the screen. Control of the slope of echo groups is achieved by variation of the delays generated in delay devices DL1, DL2 and these controls may also be arranged in random steps. Control of the simulated target velocity can be exercised by variation of the time constant in the push-pull integrator PPI to vary the angle of slope of wave form 101.

*Display of simulated signals (FIGURES 6, 9 and 11)*

The manner in which the range and azimuth pulse series are fed to the screen will now be described in connection with the right hand portion of FIGURE 6.

Figure 9:
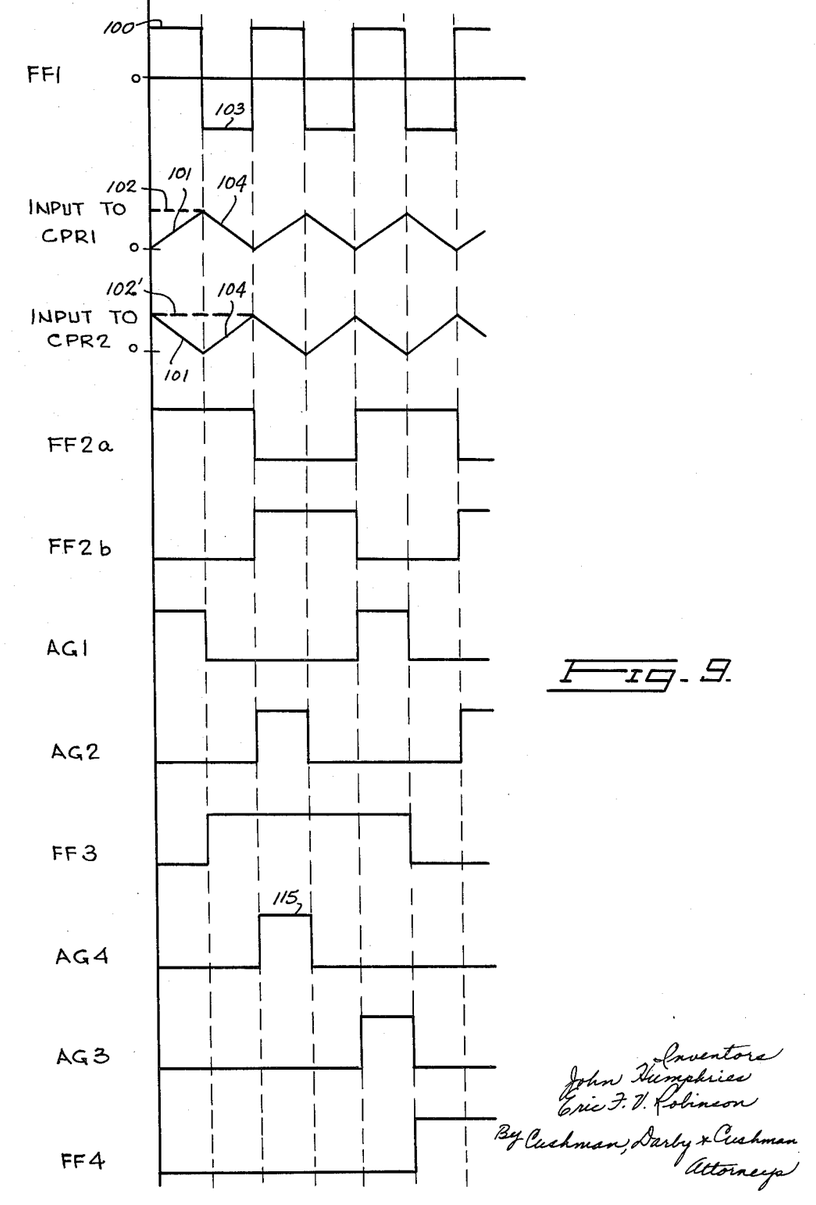

It has already been demonstrated how the flip-flop FF1 generates a square wave (FIGURE 9). The square wave is also fed to a further flip-flop FF2 which halves its input wave in a conventional manner to provide the pair of outputs FF2a and FF2b mutually opposite in phase shown in FIGURE 9. These outputs are fed respectively to AND gates AG1 and AG2 which also receive inputs directly from the flip-flop FF1. The gates AG1 and AG2 further modify the original wave form received from flip-flop FF1 to yield quarter square waves, as shown in FIGURE 9. This output from gate AG1 is fed to a further flip-flop FF3 which is also energised from a control flip-flop FF4 through an inhibit circuit INH. Flip-flop FF4 is initially driven to one state by a pulse from a starting push button SPB operated by the instructor. The inhibit circuit INH positively prevents flip-flop FF3 from occupying its on state, except when the flip-flop FF4 is switched on to render inactive the inhibit circuit INH. When flip-flop FF4 is on, flip-flop FF3 is in readiness to be switched on by a signal from gate AG1, and is so conditioned as to be switched on by the back edge of this signal. FIGURE 9 shows FF3 going on as AG1 goes off. With flip-flop FF3 now on it energizes one of the inputs of each of further AND gates AG3 and AG4. Gate AG3 also receives the output of gate AG1 and hence generates an output when both gate AG1 and flip-flop FF3 are on. Gate AG4 similarly generates an output when both gate AG2 and flip-flop FF3 are on. These outputs of gates AG3 and AG4 are shown in FIGURE 9. The output of gate AG3 is also brought around to the control flip-flop FF4 which is reset by the back edge of the output from gate AG3 to reactivate the inhibit circuit INH to hold off the flip-flop FF3 from further operation until the starting push button switch SPB is again actuated.

Typically, the actuating pulse 115 emitted by gate AG4 will be about 1 second long. This same pulse has been shown expanded in FIGURE 11 to simplify the description which now follows regarding the effect which this pulse has on a further AND gate AG5 into which there are also fed the first to be presented range and azimuth pulse series RAa and AZa. There will be, typically, about 40 pulses per second in the series AZa and a much larger number of pulses in the series RAa. These are shown on approximately comparable scales in FIGURE 11. There is yet another input BSC to the gate AG5. FIGURE 6 shows a beam selection circuit BSC which receives a 20 cycle input from the second square wave generator SWG2 in FIGURE 3. The output of beam selection circuit BSC passes through a reversible switch RVS to the AND gate AG5. The input frequency to the beam selection circuit is 20 cycles, in contrast to the 40 cycle azimuth sweep frequency ASG.

Figure 11:
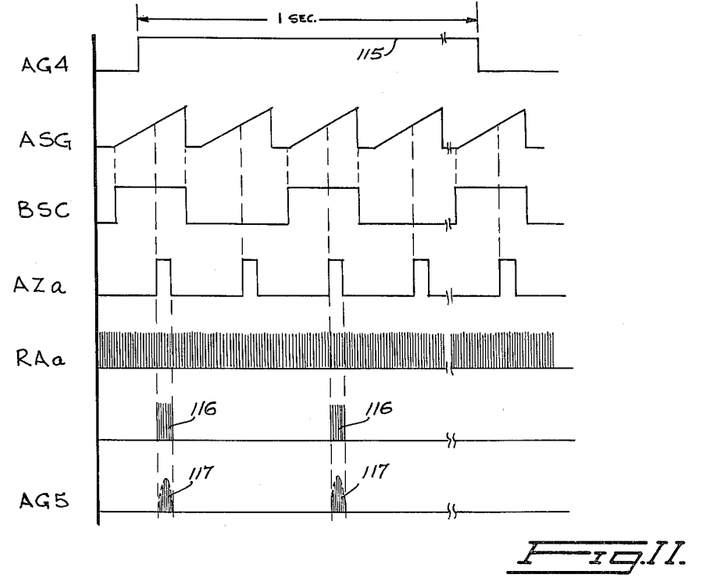
FIGURE 11 is another time sequence diagram.

The gate AG5 emits an output signal only when all four of the inputs (AG4, BSC, AZa and RAa) shown in FIGURE 11 are present. The result is a sequence of output pulses 116, which by means of a conventional shaping circuit embodied in the gate AG5 are modified to take the shape shown at 117. This shape more realistically simulates the appearance of a target, the natural response from which increases to a maximum and then falls away as the radar beam sweeps across it. Although made up of individual pulses, each of the groups 117 marks the screen as if it were a single pulse. As a result a pulse 117 of the output sequence emerges from the gate AG5 only every alternate azimuth sweep AZa, as shown in FIGURE 11. This is done to simulate the natural condition. Assuming the operator is watching a target in the lower beam, he will only receive an echo every second azimuth sweep, because the narrow beam will be sweeping in the upper beam during the intermediate azimuth sweeps. Use of the beam selection circuit BSC can be dispensed with for simplified operation. Gate AG5 then only requires the three inputs AG4, AZa and RAa.

A further AND gate AG6 corresponding generally in function to the gate AG5 is provided to feed the second output pulse sequence for the second to be presented echo group. The gate AG6 receives an actuating pulse from the gate AG3, which is delayed in relation to the actuating pulse from gate AG4, and also the second to be presented range and azimuth pulse series RAb and AZb. It also is only switched on every second azimuth sweep by virtue of the signal it receives from the beam selection circuit BSC, the pulses of this latter signal alternating with those that switch on gate AG5.

The outputs from gates AG5 and AG6 are mixed in an OR gate OG1 and emerge therefrom as the signal S1 shown coming from the block diagram RDR in FIGURE 3 for further amplification and generation of the beam identification signals in the manner shown in FIGURE 3 before presentation on the screen S. The position of the reversible switch RSV determines which of the AND gates AG5 and AG6 will correspond to the upper beam and which will correspond to the lower beam, although gate AG5 will always generate the first to be presented sequence of output pulses, because it receives the first-occurring actuating pulse from gate AG4, while gate AG6 receives the second-occurring actuating pulse from gate AG3.

If a continuous target is required, for example for calibration of the screen, continuous target switch CTS is closed to provide inputs of gates AG5 and AG6 equivalent to continuous inputs from gates AG3 and AG4 and from the beam selection circut BSC.

We claim.:

1. For use with a radar system having means for producing a plurality of radar beams, means synchronised with said producing means for generating azimuth sweep signals corresponding to each of said beams, means for generating range sweep signals, a range-azimuth radar display connected to said generating means to receive said azimuth and range sweep signals; target simulating apparatus comprising
   (a) means for generating a first series of range pulses synchronised with the range sweep signals, including means for progressively modifying the timing of each successive such range pulse in relation to successive range sweep signals,
   (b) means for duplicating each of said range pulses a predetermined short time after its occurrence to generate a second series of range pulses,
   (c) means for generating a first series of azimuth pulses synchronised with the azimuth sweep signals, including means for progressively modifying the timing of each successive azimuth pulse in relation to successive azimuth sweep signals,
   (d) means for duplicating each of said azimuth pulses a predetermined short time after its occurrence to generate a second series of azimuth pulses,
   (e) selection and gating means for emitting a first sequence of output pulses each appearing upon coincident input of
       (i) a pulse of a selected one of said range pulse series,
       (ii) a pulse of a selected one of said azimuth pulse series,
       (iii) and a first-occurring actuating pulse,
   and for emitting a second sequence of output pulses each appearing upon coincident input of
       (iv) a pulse of a selected one of said range pulse series,
       (v) a pulse of a selected one of said azimuth pulse series,
       (vi) and a second-occurring actuating pulse,
   (f) and means transmitting said sequences of output pulses to said display to simulate echo signals returned in said beams.

2. Apparatus according to claim 1, including means for suppressing alternate pulses of each of said output sequences.

3. Apparatus according to claim 1, including
   (a) means for generating said first-occurring actuating pulse and for determining the duration thereof,
   (b) and means for generating said second-occurring actuating pulse a predetermined time after said first-occurring actuating pulse and for determining the duration of said second-occurring actuating pulse.

4. A radar system comprising
   (a) means for producing a pair of radar beams,
   (b) means synchronised with said producing means for generating azimuth sweep signals corresponding to each of said beams,
   (c) means for generating range sweep signals,
   (d) a range-azimuth radar display connected to said generating means to receive said azimuth and range sweep signals,
   (e) means for transmitting to said display echo signals returned in each of said beams,
   (f) means for generating a first series of range pulses synchronised with the range sweep signals, including means for progressively modifying the timing of each successive such range pulse in relation to successive range sweep signals,
   (g) means for duplicating each of said range pulses a predetermined short time after its occurrence to generate a second series of range pulses,
   (h) means for generating a first series of azimuth pulses synchronised with the azimuth sweep signals, including means for progressively modifying the timing of each successive azimuth pulse in relation to successive azimuth sweep signals,
   (i) means for duplicating each of said azimuth pulses a predetermined short time after its occurrence to generate a second series of azimuth pulses,
   (j) selection and gating means for emitting a first sequence of output pulses each appearing upon coincident input of
       (i) a pulse of a selected one of said range pulse series,
       (ii) a pulse of a selected one of said azimuth pulse series,
       (iii) and a first-occurring actuating pulse,
   and for emitting a second sequence of output pulses each appearing upon coincident input of
       (iv) a pulse of a selected one of said range pulse series,
       (v) a pulse of a selected one of said azimuth pulse series,
       (vi) and a second-occurring actuating pulse,
   (k) and means transmitting said sequences of output pulses to said display to simulate echo signals returned in said beams.

No references cited.

CHESTER L. JUSTUS, *Primary Examiner.*

R. E. KLEIN, R. D. BENNETT, *Assistant Examiners.*